United States Patent [19]
Andoh

[11] Patent Number: 4,893,348
[45] Date of Patent: Jan. 9, 1990

[54] POWER SOURCE CONTROL DEVICE IN CAR TELEPHONE MOBILE STATION SYSTEM

[75] Inventor: Akira Andoh, Hyogo, Japan

[73] Assignee: Mitsubishi Denki Kabushiki Kaisha, Tokyo, Japan

[21] Appl. No.: 241,460

[22] Filed: Sep. 8, 1988

[30] Foreign Application Priority Data

Sep. 9, 1987 [JP] Japan ................... 62-224012

[51] Int. Cl.$^4$ ............................................. H04B 1/38
[52] U.S. Cl. ...................................... 455/89; 455/343; 455/127; 379/58
[58] Field of Search .................. 455/117, 343, 127, 89, 455/90, 78, 79; 379/58, 63, 59

[56] References Cited

FOREIGN PATENT DOCUMENTS 62-19834 2/1987 Japan .

Primary Examiner—Robert L. Griffin
Assistant Examiner—Frederick R. Jorgenson
Attorney, Agent, or Firm—Bernard, Rothwell & Brown

[57] ABSTRACT

A power source control device in a car telephone mobile station system where an abnormal state detecting means installed within a body CPU supervises signals transmitted from a hand set CPU, and if abnormal state of the signal from the hand set CPU occurs caused by disconnection of a hand set or runaway of the hand set CPU, a power source control signal is inputted to a control terminal of a power source circuit so as to change the power source circuit from the ON-state into the OFF-state.

3 Claims, 5 Drawing Sheets

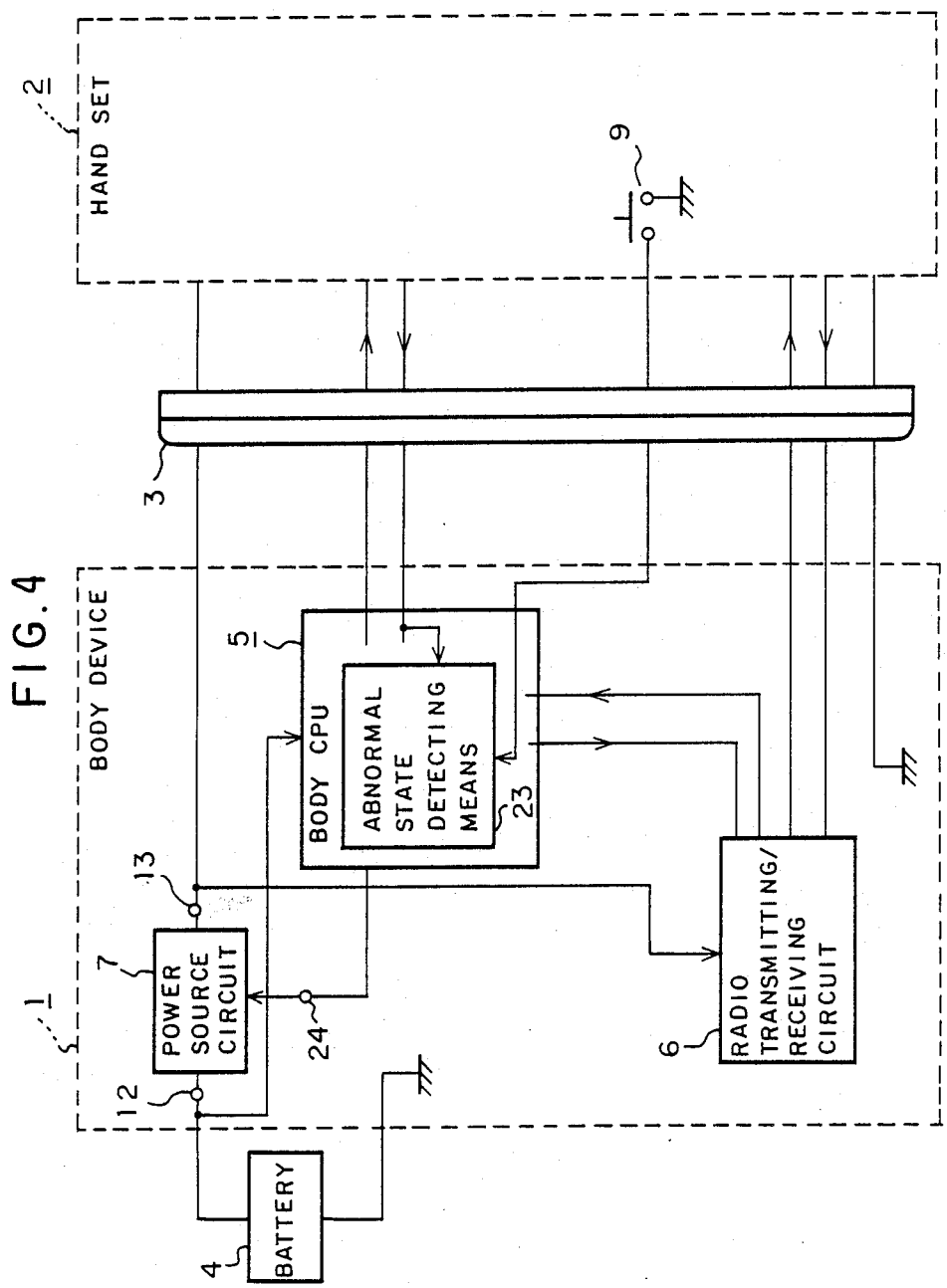

POWER SOURCE CONTROL DEVICE IN CAR TELEPHONE MOBILE STATION SYSTEM

BACKGROUND OF THE INVENTION

1. Field of the Invention

The present invention relates to a power source control device of a car telephone mobile station system.

2. Prior Art

FIG. 1 is a block diagram showing a car telephone mobile station system in the prior art. In FIG. 1, numeral 1 designates a body device, numeral 2 designates a hand set, numeral 3 designates a connector which connects the body device 1 to the hand set 2, and numeral 4 designates a battery which supplies power to the car telephone mobile station system. Also numeral 5 designates a body control unit (hereinafter referred to as "body CPU") which performs control within the body device 1, numeral 6 designates a radio transmitting-/receiving circuit which performs radio transmitting and receiving to an exchange under control of the body CPU 5, and numeral 7 designates a power source circuit which performs ON/OFF control of the power supply from the battery 4 to the body device 1 and through the connector 3 to each circuit in the hand set 2, and the body 1 is provided with these various circuits. Further, numeral 8 designates a hand set control unit (hereinafter referred to as "hand set CPU") which transmits or receives signals to or from the body control unit 5 and performs control within the hand set 2, numeral 9 designates a momentary switch as a power source switch which transmits power source control signals for the ON/OFF control of the power source circuit 7, numeral 10 designates a voice circuit which transmits or receives voice signals to or from the radio transmitting-/receiving circuit 6 of the body device 1 by talking, and numeral 11 designates a key input circuit connected to the hand set CPU 8, and the hand set 2 is provided with these various circuits. Also numeral 12 designates a power source input terminal for the power source circuit 7, numeral 13 designates a power source output terminal therefor, and numeral 14 designates an input terminal to which power source control signals from the momentary switch 9 of the hand set 2 are inputted.

Next, operation of the system will be described. When the hand set 2 is normally connected through the connector 3 to the body device 1, if the momentary switch 9 is operated, a power source control signal by grounding is produced, and transmitted through the connector 3 to the body device 1 and then inputted to the input terminal 14 of the power source circuit 7. The power source circuit 7 in the OFF-state is turned on by inputting the power source control signal to the input terminal 14, and this state is held. Since the power source circuit 7 is turned on, the power supply inputted from the battery 4 to the power source input terminal 12 of the power source circuit 7 is supplied from the power source output terminal 13 to the body CPU 5 and the radio transmitting/receiving circuit 6 within the body device 1, and further through the connector 3 to the hand set CPU 8, the voice circuit 10 and the like within the hand set 2.

Since the car telephone mobile station system in the prior art is constituted as above described, if the power source circuit 7 remains in the ON-state and the hand set 2 is disconnected from the body device 1 by the connector 3, the power source circuit 7 is held to the ON-state, thereby the power source continues to supply power to the body device 1 and a problem is produced from the viewpoint of safety. Further if the hand set CPU 8 runs away, the user must operate the momentary switch 9 so as to turn off the power source circuit 7 once, and operate the momentary switch 9 again so as to turn on the power source circuit 7, and reset the hand set CPU 8 thus another problem is produced.

SUMMARY OF THE INVENTION

In order to eliminate the above-mentioned problems in the prior art, an object of the invention is to provide a power source control device in a car telephone mobile station system, wherein a power source circuit is turned off automatically, when a hand set is disconnected from a connector or when a hand set CPU runs away.

A power source control device in a car telephone mobile station system according to the invention comprises an abnormal state detecting means which is installed within a body CPU and detects an abnormal state of a signal from a hand set CPU and transmits a power source control signal to turn off the power source circuit upon detecting the abnormal state of the signal, and a control terminal which is installed in the power source circuit and to which the power source control signal from the abnormal state detecting means of the body CPU is inputted.

Other objects and features of the invention will be apparent more fully from the following detailed description of embodiments with reference to the accompanying drawings.

BRIEF DESCRIPTION OF THE DRAWINGS

FIG. 4 is a block diagram illustrating another embodiment of the invention;

PREFERRED EMBODIMENTS OF THE INVENTION

Figure 1:
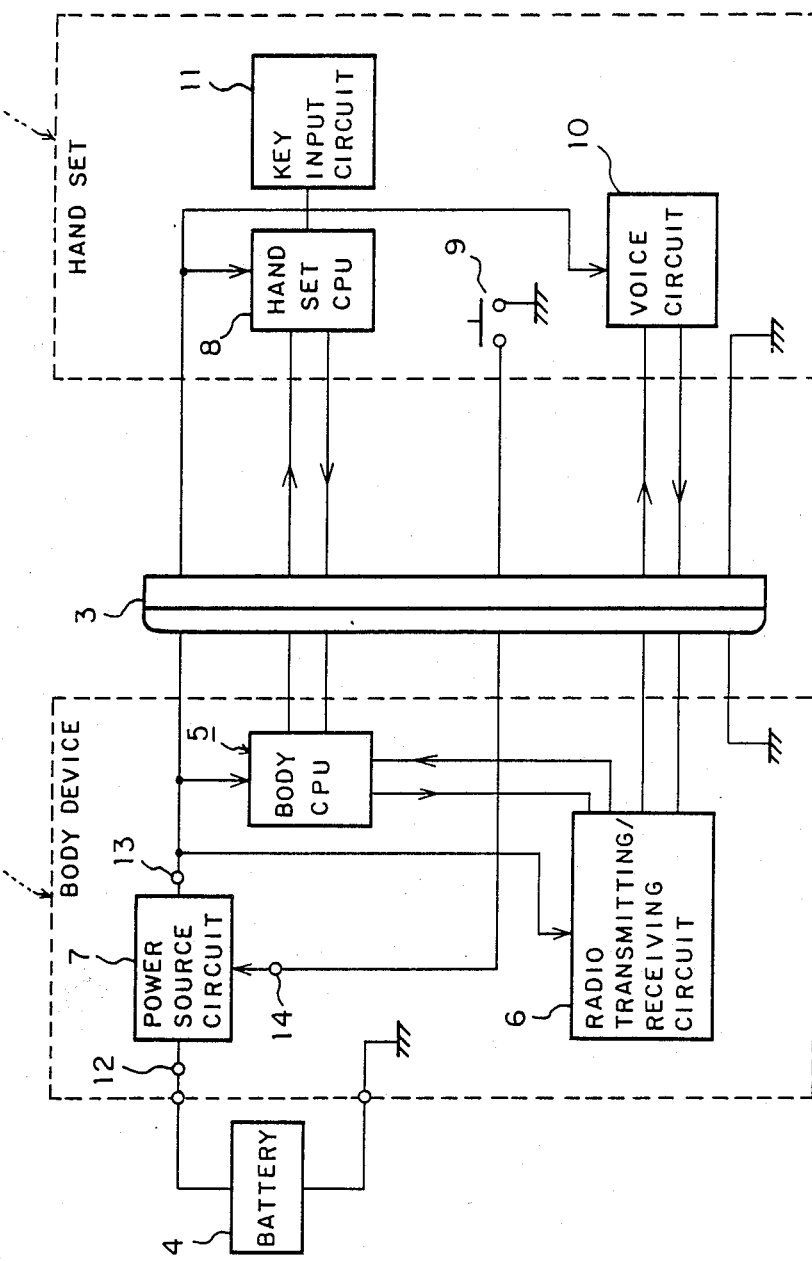
FIG. 1 is a block diagram of a car telephone mobile station system in the prior art.
Figure 2:
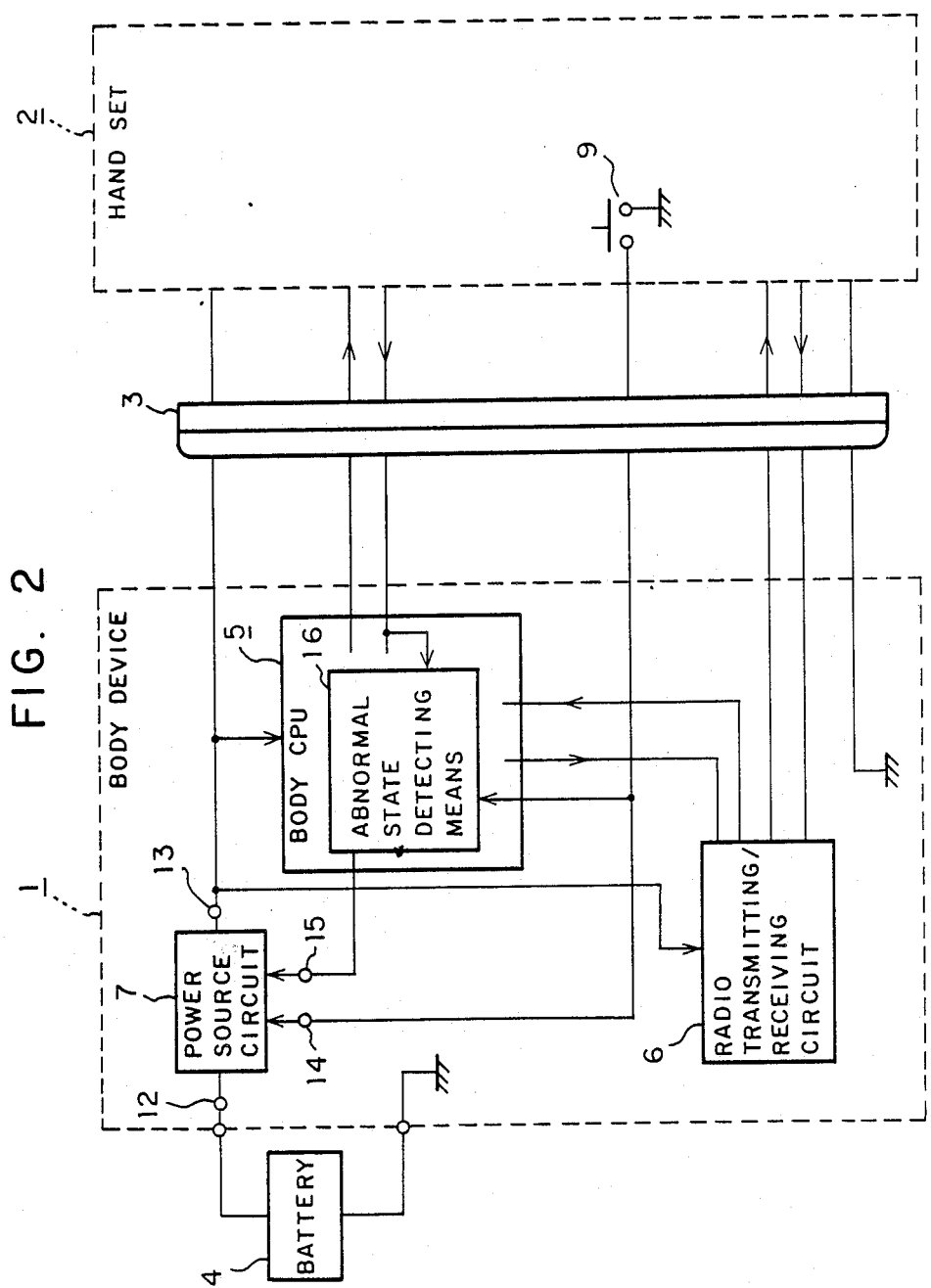
FIG. 2 is a block diagram of a car telephone mobile station system as an embodiment of the invention.

An embodiment of the invention will now be described referring to the accompanying drawings. In FIG. 2, numeral 1 designates a body device, numeral 2 designates a hand set, numeral 3 designates a connector, numeral 4 designates a battery, numeral 5 designates a body CPU, numeral 6 designates a radio transmitting-/receiving circuit, numeral 7 designates a power source circuit, numeral 8 designates a hand set CPU, numeral 9 designates a momentary switch as a power source switch, numeral 11 designates a key input circuit, numeral 12 designates a power source input terminal, numeral 13 designates a power source output terminal, and numeral 14 designates an input terminal. These parts designated by the same reference numerals as that in FIG. 1 illustrating the prior art are the same or equivalent parts to those in FIG. 1, and therefore the detailed description shall be omitted. Also numeral 15 designates a control terminal which is installed in the power source circuit 7 and to which a power source control signal from the body CPU 5 is inputted, and numeral 16 designates an abnormal state detecting means which is formed within the body CPU 5, for example, by software, and supervises abnormal state of signals from the hand set CPU 8, and generates a power source control signal to turn off the power source circuit 7 and transmits it to the control terminal 15 of the power source circuit 7 if occurrence of the abnormal state is detected in the signal from the hand set CPU 8.

Figure 3:
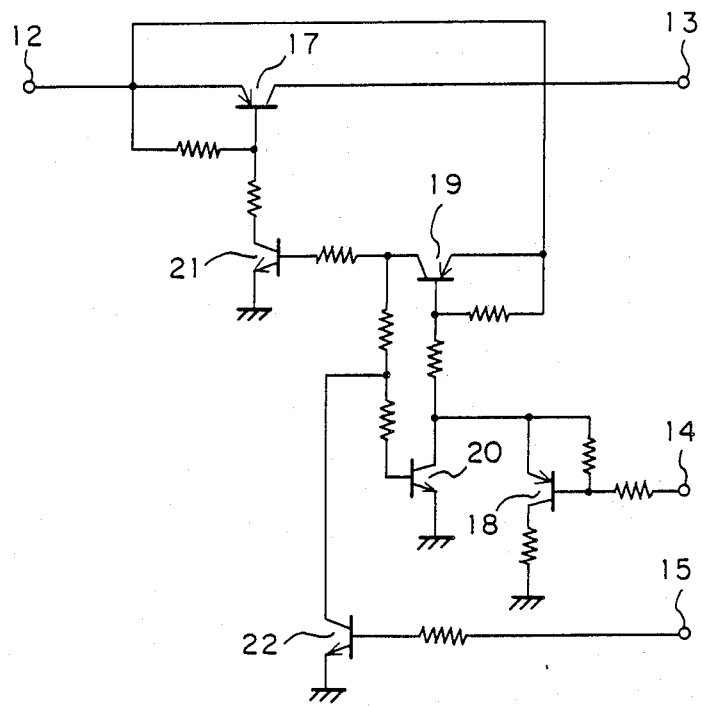
FIG. 3 is a circuit diagram illustrating an example of a power source circuit in the system of FIG. 2.

Next, operation of the system will be described. When the hand set 2 is normally connected through the connector 3 to the body device 1, in similar manner to the prior art, a grounding power source control signal according to operation of the momentary switch 9 is transmitted through the connector 3 to the body device 1 and then inputted to the input terminal 14 of the power source circuit 7. FIG. 3 is a circuit diagram illustrating an example of the power source circuit 7. In FIG. 3, numeral 12 designates a power source input terminal, numeral 13 designates a power source output terminal, numeral 14 designates an input terminal, numeral 15 designates a control terminal, numeral 17 designates a transistor which turns on or off the power supply from the battery 4, and numerals 18–22 designate transistors which control the transistor 17. If the grounding power source control signal is inputted to the input terminal 14, the transistor 18 is turned on and the transistor 20 is turned off. As a result, the transistor 19 is turned on, and even if the power source control signal of the input terminal 14 disappears, base current of the transistor 19 is continued to flow through the transistor 20 thereby the ON-state of the transistor 19 is held. The transistor 21 is supplied with base current by the transistor 19, and held to the ON-state. As a result, the transistor 17 is turned on, and this state is held. Thus the power source circuit 7 in the OFF-state is turned on by input of the power source control signal and the ON-state is held, and the power supply inputted from the battery 4 to the power source input terminal 12 is supplied from the power source output terminal 13 to the body CPU 5 and the radio transmitting/receiving circuit 6 within the body device 1 and further to the hand st CPU 8, the voice circuit 10 and the like within the hand set 2.

In this case, when the power source circuit 7 is in the ON-state, if the hand set 2 is disconnected from a portion of the connector 3 by any reason, the signal from the hand set CPU 8 is not transmitted to the body CPU 5. The abnormal state detecting means 16 formed within the body CPU 5, on detecting interruption of the signal from the hand set CPU 8, transmits the power source control signal of high level to the control terminal 15 of the power source circuit 7 so as to turn off the power source circuit 7. In the power source circuit 7, the transistor 22 is turned on by the power source control signal, thereby the transistor 20 is turned off because its base current is interrupted. As a result, the transistor 21 is turned off because its base current is interrupted, and the transistor 17 is turned off. Thus the power source circuit 7 in the ON-state is turned off by input of the power source control signal, and supply of the power from the battery 4 is stopped. Also if the hand set CPU 8 runs away, the abnormal state detecting means 16 formed within the body CPU 5, on detecting irregularity of the signal from the hand set CPU 8 due to the runaway, transmits the power source control signal of high level to the control terminal 15 of the power source circuit 7 so as to turn off the power source circuit 7. Subsequently in similar manner to the above description, the power source circuit 7 is turned off, and supply of the power from the battery 4 is stopped.

Figure 5:
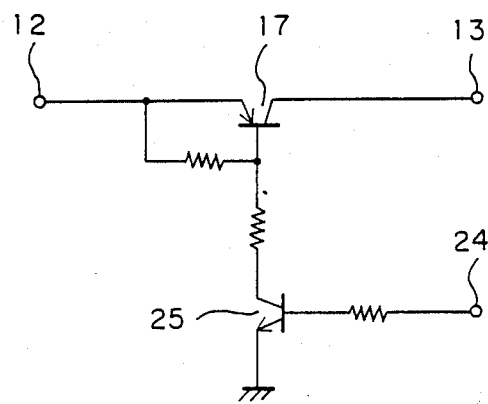
FIG. 5 is a circuit diagram illustrating an example of a power source circuit in the system of FIG. 4.
Figure 6:
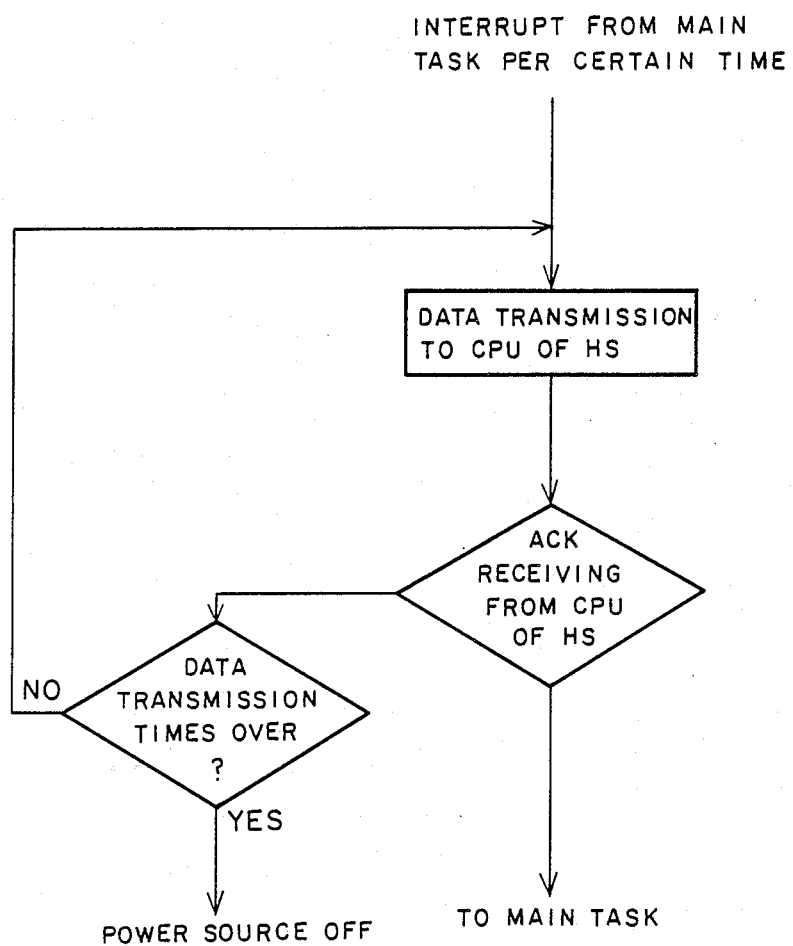
FIG. 6 is a flowchart illustrating a procedure for attaining abnormal state detecting function.

In the above-mentioned embodiment, although the power source control signal from the momentary switch and the power source control signal from the body CPU based on the abnormal state of signal from the hand set CPU are separately inputted, the signal from the momentary switch and the abnormal state of the signal from the hand set CPU may both be processed by the body CPU, and unitary power source control signal may be generated and supplied to the power source circuit. FIG. 4 is a block diagram illustrating such an embodiment, and FIG. 5 is a circuit diagram illustrating an example of its power source circuit, and further FIG. 6 is a flowchart illustrating means for attaining the abnormal state detecting function. In FIG. 4, numeral 23 designates an abnormal state detecting means which is formed within the body CPU 5, and generates and transmits the unitary power source control signal for turning on the power source switch 7 based on the signal from the momentary switch 9 and for turning off the power source circuit 7 at detecting the abnormal state of the signal from the hand set CPU 8, and numeral 24 designates a control terminal which is installed in the power source circuit 7 and to which the unitary power source control signal is inputted.

When the hand set 2 is normally connected through the connector 3 to the body device 1, the grounding signal by operation of the momentary switch 9 is transmitted through the connector 3 to the abnormal state detecting means 23 within the body CPU 5, and the abnormal state detecting means 23 changes the power source control signal into high level based on the grounding signal. In the power source circuit 7, shown in FIG. 5 if the power source control signal of high level is inputted to the control terminal 24, the transistor 25 is turned on and therefore the transistor 17 is also turned on. Consequently, the power source circuit 7 is turned on by the power source control signal of high level, and the power from the battery 4 is supplied from the power source output terminal 13 to the body CPU 5 and the radio transmitting/receiving circuit 6 and further to the hand set CPU 8, the voice circuit 10 and the like. Also when the power source circuit 7 is in the ON-state, if the hand set 2 is pulled out or the hand set CPU 8 runs away, the abnormal state detecting means 23 changes the power source control signal into low level at detecting the abnormal state of the signal from the hand set CPU 8. As a result, the transistor 25 is turned off and therefore the transistor 17 is also turned off. Thus the power source circuit 7 is turned off by the power source control signal of low level, and supply of the power from the battery 4 is stopped.

As above described, according to the invention, the abnormal state detecting means installed in the body CPU detects the abnormal state of the signal transmitted from the hand set CPU, and if the abnormal state is detected, the power source control signal to turn off the power source circuit is inputted to the control terminal. Consequently, the power source control device in the car telephone mobile station system is obtained, wherein the power source circuit is automatically turned off, if the hand set is pulled out of the connector or the hand set CPU 8 runs away.

What is claimed is:

1. A car telephone mobile station system, comprising:

a body device including a body control unit, a radio transmitting/receiving circuit controlled by said body control unit, a battery for providing a source of power, and a power source circuit controlling the supply of power to said body control unit and said radio transmitting/receiving circuit from said battery in response to an ON/OFF signal;

a hand set connected to said body device and receiving power from said power source circuit including a hand set control unit communicating with said body control unit, a power source switch providing a first power source control signal for developing said ON/OFF signal to said power source circuit, and a voice circuit for transmitting and receiving voice signals to and from said radio transmitting/receiving circuit;

a control terminal provided at said power source control circuit which receives a second power source control signal for turning said power source circuit off; and abnormal state detecting means provided in said body control unit for detecting an abnormal state of a signal from said hand set control unit and developing said second power source control signal in response thereto.

2. A system as a set forth in claim 1, wherein said abnormal state detecting means further receives said first power source control signal from said power source switch and provides said ON/OFF signal to said power source circuit in response thereto.

3. A system as set forth in claim 1, wherein said first power source control signal is applied directly to said power source circuit as said ON/OFF signal.

* * * * *

UNITED STATES PATENT AND TRADEMARK OFFICE
CERTIFICATE OF CORRECTION

PATENT NO. : 4,893,348

DATED : January 9, 1990

INVENTOR(S) : Akira Andoh

It is certified that error appears in the above-identified patent and that said Letters Patent is hereby corrected as shown below:

Column 2, line 59, after "switch," insert --numeral 10 designates a voice circuit,--.

Column 3, line 43, "st" should be --set--.

Column 4, line 35, delete the comma ",";

line 36, after "5" insert a comma --,--.

Signed and Sealed this

Twenty-sixth Day of March, 1991

Attest:

HARRY F. MANBECK, JR.

*Attesting Officer*  *Commissioner of Patents and Trademarks*